United States Patent
Patel et al.

(10) Patent No.: US 10,656,339 B2
(45) Date of Patent: May 19, 2020

(54) FIBER TO CHIP ALIGNMENT USING PASSIVE VGROOVE STRUCTURES

(71) Applicant: Cisco Technology, Inc., San Jose, CA (US)

(72) Inventors: Vipulkumar Patel, Breinigsville, PA (US); Ashley J. Maker, Pleasanton, CA (US); Anthony D. Kopinetz, York, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/146,311

(22) Filed: Sep. 28, 2018

(65) Prior Publication Data

US 2019/0285813 A1    Sep. 19, 2019

Related U.S. Application Data (60) Provisional application No. 62/642,895, filed on Mar. 14, 2018.

(51) Int. Cl.
  *G02B 6/30*    (2006.01)
  *G02B 6/42*    (2006.01)
  *G02B 6/36*    (2006.01)

(52) U.S. Cl.
  CPC ............ *G02B 6/30* (2013.01); *G02B 6/423* (2013.01); *G02B 6/4239* (2013.01); *G02B 6/3636* (2013.01)

(58) Field of Classification Search
  CPC ...................................................... G02B 6/30
  See application file for complete search history.

(56) References Cited

U.S. PATENT DOCUMENTS 4,323,300 A * 4/1982 Stewart ............... G02B 6/3885
                                                                      385/59
4,725,114 A    2/1988 Murphy
                      (Continued)

FOREIGN PATENT DOCUMENTS

EP    0532470 A1 *  3/1993    ............ G02B 6/30
EP    0532470 A1    3/1993
                      (Continued)

OTHER PUBLICATIONS

Parriaux et al., Machine Translation of EP 0532470 A1, Mar. 1993. (Year: 1993).*

(Continued)

*Primary Examiner* — Michelle R Connelly
(74) *Attorney, Agent, or Firm* — Patterson + Sheridan, LLP (57) ABSTRACT

An apparatus comprises a plurality of optical fibers and a lid member having one or more surfaces with grooves formed therein. The lid member defines a first plurality of grooves that are each dimensioned to partly receive an optical fiber of the plurality of optical fibers. The apparatus further comprises a substrate comprising a plurality of waveguides arranged at a predefined depth relative to a reference surface of the substrate, and a plurality of ribs extending from the reference surface. Each rib of the plurality of ribs is dimensioned to engage with a respective groove of a second plurality of grooves of the lid member. Engaging the plurality of ribs of the substrate with the second plurality of grooves of the lid member provides an optical alignment of the plurality of optical fibers with the plurality of waveguides.

20 Claims, 9 Drawing Sheets

(56) References Cited

U.S. PATENT DOCUMENTS

| | | |
|---|---|---|
| 5,218,663 A | 6/1993 | Isono |
| 5,297,228 A | 3/1994 | Yanagawa |
| 5,574,811 A | 11/1996 | Bricheno |
| 5,736,429 A | 4/1998 | Tregoat |
| 5,984,534 A | 11/1999 | Elderstig |
| 6,118,917 A | 9/2000 | Lee |
| 6,160,936 A | 12/2000 | You |
| 6,847,764 B2 | 1/2005 | Steinberg |
| 6,905,256 B2 | 6/2005 | Morse et al. |
| 7,234,874 B2 | 6/2007 | Morse et al. |
| 7,292,756 B2 | 11/2007 | Moynihan et al. |
| 7,317,746 B2 | 1/2008 | Ericson |
| 9,274,275 B2 | 3/2016 | Webster et al. |
| 9,651,739 B2 | 5/2017 | Webster et al. |
| 9,995,881 B1 | 6/2018 | Patel et al. |
| 10,048,455 B2 | 8/2018 | Pfnuer |
| 2004/0057653 A1 | 3/2004 | Fukuda |
| 2005/0163431 A1 | 7/2005 | Moynihan |
| 2006/0291782 A1 | 12/2006 | Carpenter |
| 2008/0226222 A1 | 9/2008 | Kim |
| 2013/0209026 A1 | 8/2013 | Doany et al. |
| 2015/0356818 A1 | 12/2015 | Rajaraman et al. |
| 2016/0070074 A1 | 3/2016 | Wang |
| 2016/0291253 A1 | 10/2016 | Furuya |
| 2017/0205592 A1* | 7/2017 | Pfnuer ................ G02B 6/4243 |

FOREIGN PATENT DOCUMENTS

| | | | |
|---|---|---|---|
| EP | 0718649 A1 | | 6/1996 |
| JP | 08201649 A | * | 8/1996 |

OTHER PUBLICATIONS

Yamada et al., Machine Translation of JP 08201649 A, Aug. 1996. (Year: 1996).*

U.S. Appl. No. 15/841,005 "Passive Fiber Coupler with UV Windows," filed Dec. 13, 2017.

PLC Connections, "PLC-Transposer for Edge Coupling to Silicon PICs," revised Feb. 8, 2015.

researcher.watson.ibm.com "Silicon Nanophotonic Packaging," [Accessed Online Jun. 16, 2017].

* cited by examiner

FIBER TO CHIP ALIGNMENT USING PASSIVE VGROOVE STRUCTURES

CROSS-REFERENCE TO RELATED APPLICATIONS

This application claims benefit to U.S. provisional application Ser. No. 62/642,895, entitled "FIBER TO CHIP ALIGNMENT USING PASSIVE VGROOVE STRUCTURES" and filed on Mar. 14, 2018. The aforementioned related patent application is herein incorporated by reference in its entirety.

TECHNICAL FIELD

Embodiments presented in this disclosure generally relate to techniques for optical alignment of multiple optical fibers with waveguides of a substrate.

BACKGROUND

Many approaches have been proposed for improving an optical coupling between optical fiber(s) and semiconductor chips. However, such approaches can require precisely-machined interlocking features, expensive piece parts, and more complex fiber array unit (FAU) and chip designs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an apparatus comprising a plurality of optical fibers and a lid member having one or more surfaces with grooves formed therein. The lid member defines a first plurality of grooves that are each dimensioned to partly receive an optical fiber of the plurality of optical fibers. The apparatus further comprises a substrate comprising a plurality of waveguides arranged at a predefined depth relative to a reference surface of the substrate, and a plurality of ribs extending from the reference surface. Each rib of the plurality of ribs is dimensioned to engage with a respective groove of a second plurality of grooves of the lid member. Engaging the plurality of ribs of the substrate with the second plurality of grooves of the lid member provides an optical alignment of the plurality of optical fibers with the plurality of waveguides.

Another embodiment is a method comprising forming a first plurality of grooves and a second plurality of grooves into a lid member. Each of the first plurality of grooves is dimensioned to partly receive an optical fiber of a plurality of optical fibers. The method further comprises inserting the plurality of optical fibers into the first plurality of grooves, and engaging the second plurality of grooves with a plurality of ribs extending from a reference surface of a substrate. A plurality of waveguides is arranged at a predefined depth relative to the reference surface. Engaging the plurality of ribs of the substrate with the second plurality of grooves of the lid member provides an optical alignment of the plurality of optical fibers with the plurality of waveguides.

Example Embodiments

Figure 1A:
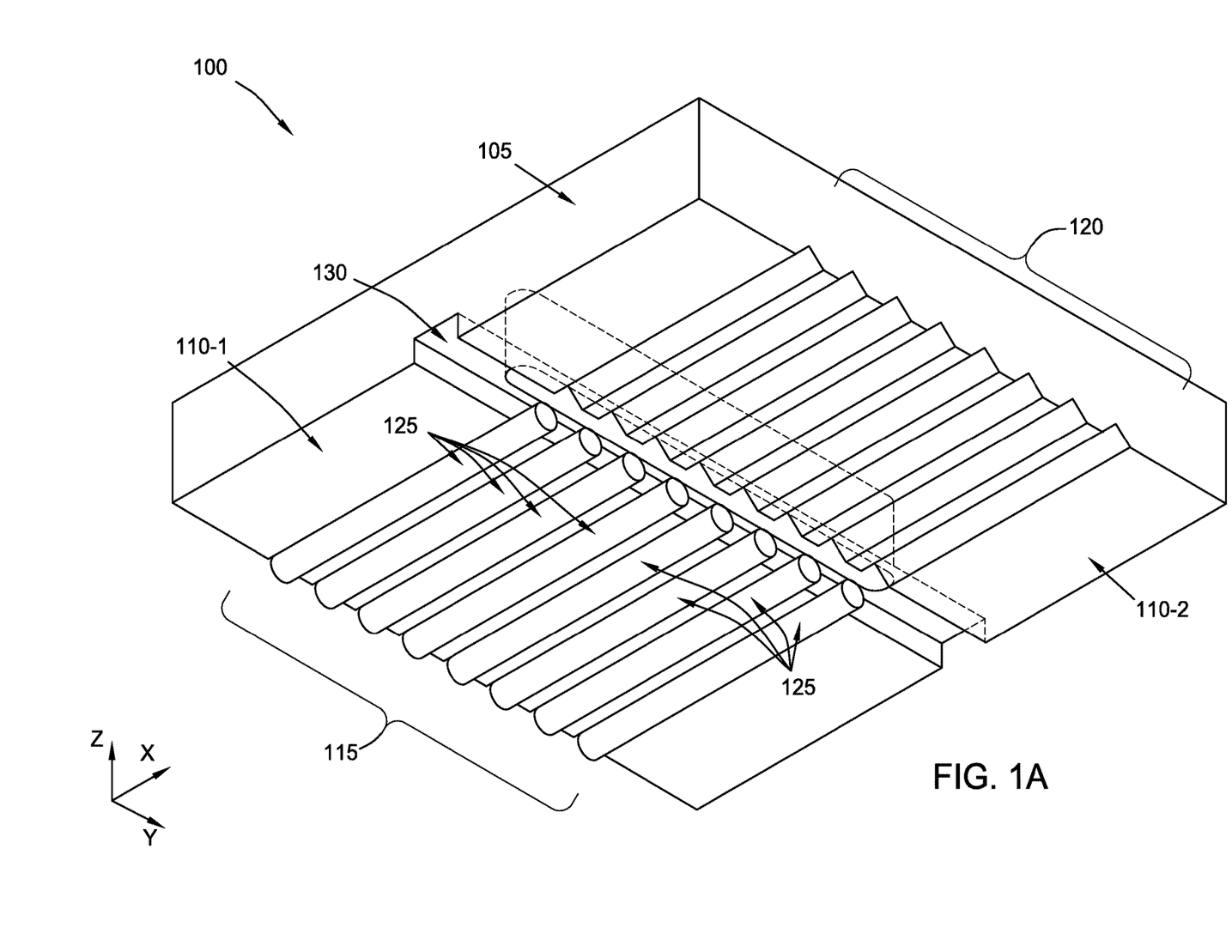
FIGS. 1A-1C illustrate views of an exemplary assembly comprising a lid member and a plurality of optical fibers, according to one embodiment.
Figure 1B:
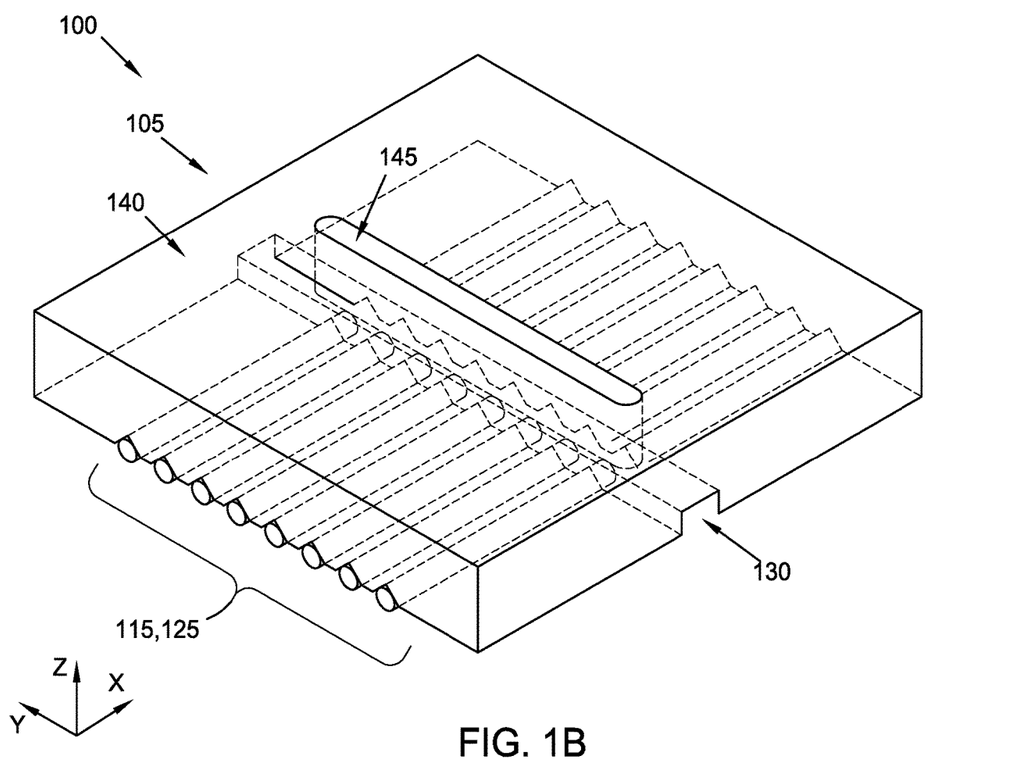
Figure 1C:
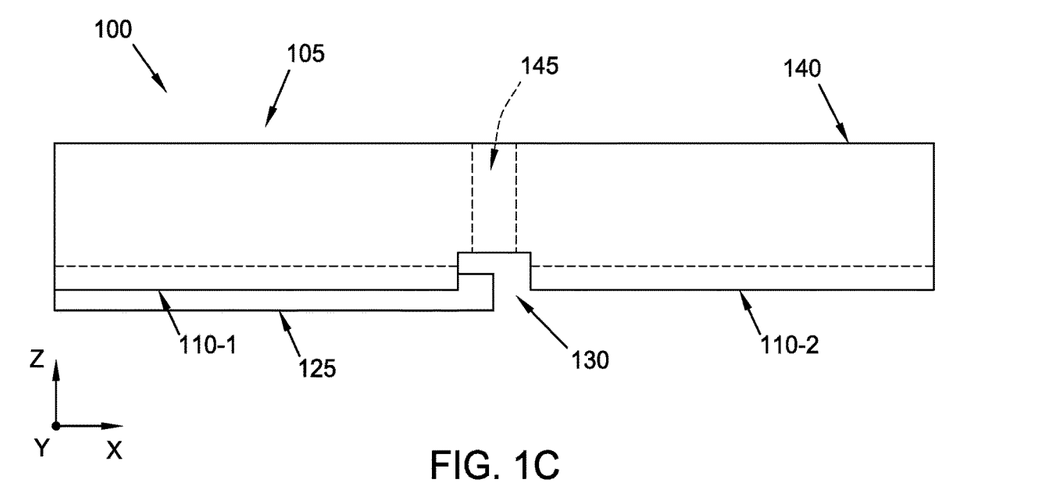

FIGS. 1A-1C illustrate views of an exemplary assembly 100 comprising a lid member and a plurality of optical fibers, according to one embodiment. The assembly 100 comprises a lid member 105 connected with a plurality of optical fibers 125 using any suitable techniques. The lid member 105 defines a first plurality of grooves 115 from a bottom surface 110-1 thereof. In some embodiments, the bottom surface 110-1 is substantially planar. In some embodiments, grooves of the first plurality of grooves 115 are formed in parallel with each other. Each of the first plurality of grooves 115 is dimensioned to partly receive an optical fiber 125 of the plurality of optical fibers 125. An adhesive such as an epoxy may be applied to rigidly adhere the plurality of optical fibers 125 with the first plurality of grooves 115. In some embodiments, the epoxy may be index-matching with the plurality of optical fibers 125.

The lid member 105 further defines a second plurality of grooves 120 from a bottom surface 110-2. In some embodiments, the bottom surface 110-2 is substantially planar. In some embodiments, the bottom surfaces 110-1, 110-2 are coplanar. In some embodiments, grooves of the second plurality of grooves 120 are formed in parallel with each other. In some embodiments, and as will be discussed below, ribs or other features of a substrate may be dimensioned to engage the second plurality of grooves 120 and to thereby provide an optical alignment of the plurality of optical fibers 125 with waveguides and/or other optical elements included in the substrate.

The first plurality of grooves 115 and the second plurality of grooves 120 may be formed using any suitable techniques. In some embodiments, the first plurality of grooves 115 and the second plurality of grooves 120 are formed via one or more of a sawing operation, a molding operation, an etching operation, and a laser patterning operation.

In some embodiments, the first plurality of grooves 115 and the second plurality of grooves 120 have the same or similar dimensioning. For example, the bottom surfaces 110-1, 110-2 may be a continuous surface in an initial state, and the first plurality of grooves 115 and the second plurality of grooves 120 may be formed as a plurality of continuous grooves into the continuous surface during a first sawing operation. The continuous surface may be separated into the bottom surfaces 110-1, 110-2, and the continuous grooves may be separated into the first plurality of grooves 115 and the second plurality of grooves 120 during a second sawing operation (e.g., forming a channel 130). In other embodiments, however, the first plurality of grooves 115 and the second plurality of grooves 120 may be formed separately and/or with different dimensioning, e.g., using molding or laser patterning techniques.

The lid member 105 may comprise any suitable material(s). In some embodiments, the lid member 105 comprises a material that is transmissive of ultraviolet (UV) light. For example, UV light may be transmitted through the lid member 105 to partly or completely cure an epoxy that rigidly adheres the lid member 105 with the plurality of optical fibers 125, and/or to partly or completely cure an epoxy that rigidly adheres the lid member 105 with a substrate. In some embodiments, the lid member 105 comprises a glass material. Beneficially, use of a glass material in the lid member 105 permits the use of inexpensive and rapid machining techniques. In this way, wafer-level processing is not required to manufacture the lid member 105, which reduces cost and/or complexity of the manufacturing. Other materials that are transmissive of UV light and are able to patterned with precise grooves are also contemplated for use in the lid member 105. Some non-limiting examples include silicon, polymers, and moldable materials.

In some embodiments, the lid member 105 further defines the channel 130 from the bottom surface 110-1 and/or the bottom surface 110-2. The channel 130 may be arranged between the first plurality of grooves 115 and the second plurality of grooves 120, and may extend substantially perpendicular to the longitudinal axes of the first plurality of grooves 115 and/or the second plurality of grooves 120. In some embodiments, the channel 130 may be sawed from the bottom surface 110-1 and/or the bottom surface 110-2, but other suitable techniques are also possible.

The plurality of optical fibers 125 may be arranged to extend into the channel 130. In some embodiments, the plurality of optical fibers 125 may be cleaved to have substantially a same extent into the channel 130 (as shown, in the positive-X direction). In some embodiments, the plurality of optical fibers 125 may be polished or otherwise processed to improve their optical characteristics.

In some embodiments, an opening 145 is formed from a top surface 140 of the lid member 105, and extends to the channel 130. Although a single opening 145 is depicted, alternate implementations may include multiple openings having any suitable arrangement. The opening 145 may be formed using any suitable techniques, such as laser drilling, sandblasting, etching, or molding. In some embodiments, when the lid member 105 is connected with a substrate via the second plurality of grooves 120, an epoxy may be applied through the opening 145 into the channel 130. Through wicking, the epoxy may also be used to rigidly adhere the ribs or features of the substrate with the second plurality of grooves 120. Further, as the epoxy in the channel 130 may intersect with the optical paths between the plurality of optical fibers 125 and the waveguides of the substrate, the epoxy may be index-matched with the plurality of optical fibers 125 and/or the waveguides of the substrate.

Figure 2:
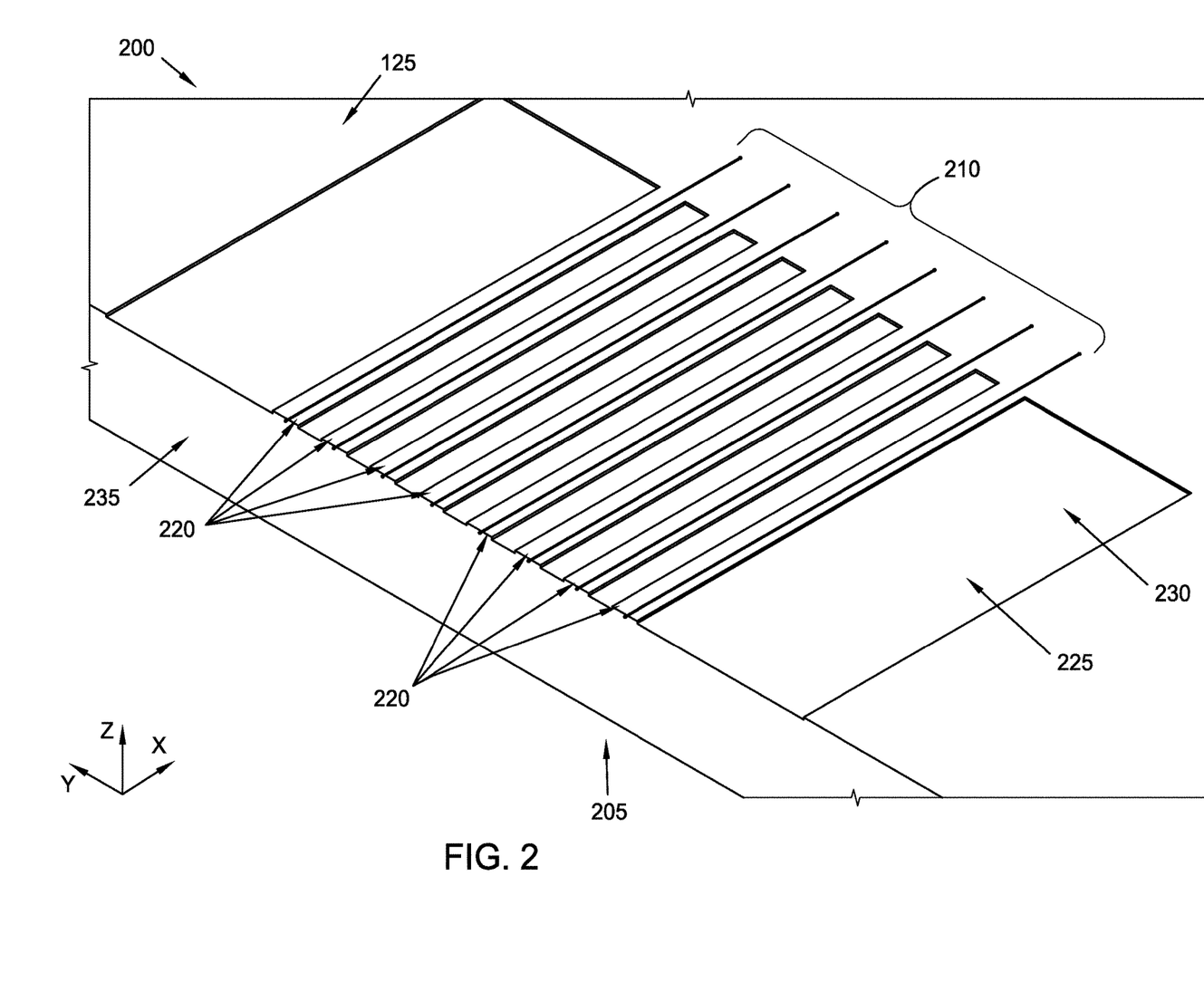
FIG. 2 illustrates an exemplary substrate comprising a plurality of waveguides and a plurality of ribs, according to one embodiment.

FIG. 2 illustrates an exemplary substrate 205 comprising a plurality of waveguides and a plurality of ribs, according to one embodiment. The substrate 205 may be used in conjunction with other embodiments, such as the assembly 100 of FIG. 1. Further, although described in terms of a single substrate 205, the features discussed herein may also be applied to other implementations, such as one or more layers grown from, or deposited onto, a substrate.

Within view 200, the substrate 205 comprises a top surface 215 and a plurality of waveguides 210 that are arranged at a predefined depth (in the Z-direction) relative to a reference surface 230. In some embodiments, the reference surface 230 comprises the top surface 215. In other embodiments, the reference surface 230 comprises a recessed surface 225 that is recessed (along the Z-dimension) from the top surface 215. The substrate 205 may be formed of any suitable semiconductor material(s), such as crystalline silicon. In some embodiments, the substrate 205 further comprises a dielectric layer (e.g., a top layer of silicon dioxide), and the plurality of waveguides 210 may be formed in the dielectric layer. In some embodiments, individual waveguides of the plurality of waveguides 210 are optically coupled with other optical components of the substrate 205 using standard approaches and coupling elements, such as mode converters, edge-coupling, evanescent coupling, gratings, turning mirrors, and so forth.

The person of ordinary skill will recognize that in some implementations (e.g., silicon photonics), the dielectric layer may further comprise circuitry for performing various electronic and/or optoelectronic functions, which may include the processing of optical signals carried on the plurality of waveguides 210.

The substrate 205 further comprises a plurality of ribs 220 that extend from the top surface 215 of the substrate 205. In some embodiments, ribs of the plurality of ribs 220 are formed in parallel with each other. In some embodiments, each rib of the plurality of ribs 220 has a substantially rectangular shape in the X-Y plane. In some embodiments, the plurality of ribs 220 have an equal spacing. In other embodiments, the plurality of ribs 220 may have non-rectangular geometries and/or non-equal spacing. In some embodiments, the plurality of ribs 220 and the plurality of waveguides 210 extend to an end face 235 of the substrate 205.

The engagement of the plurality of ribs 220 with a plurality of grooves (e.g., the second plurality of grooves 120 of the lid member 105 of FIG. 1) provides an optical alignment of the plurality of optical fibers (connected with the lid member 105) with the plurality of waveguides 210. In some embodiments, each rib of the plurality of ribs 220 may be dimensioned to engage with a respective groove of a lid member (i.e., in a 1:1 ratio). Different ratios are also possible, such as two or more ribs that are dimensioned and spaced to engage with one groove. Further, in some embodiments, one or more of the plurality of ribs 220 need not be used to engage with grooves of the lid member.

As shown, the plurality of ribs 220 extends down (i.e., in the negative-Z direction) from the top surface 215 to a recessed surface 225. Stated another way, the plurality of ribs 220 may extend into a channel formed from the top surface 215 of the substrate 205.

In some embodiments, the plurality of ribs 220 is formed by etching into the top surface 215 using any suitable techniques. In some embodiments, the plurality of ribs 220 may be formed using anisotropic etching, such that each rib has a substantially rectangular cross section (in the Y-Z plane). In some embodiments, the plurality of ribs 220 may have substantially a same height (in the Z-direction) as the dielectric layer of the substrate 205. Stated another way, the recessed surface 225 may correspond to a top surface of the crystalline silicon of the substrate 205. In one alternate implementation, the plurality of ribs 220 may extend up from the top surface 215 (in the positive-Z direction).

Figure 3A:
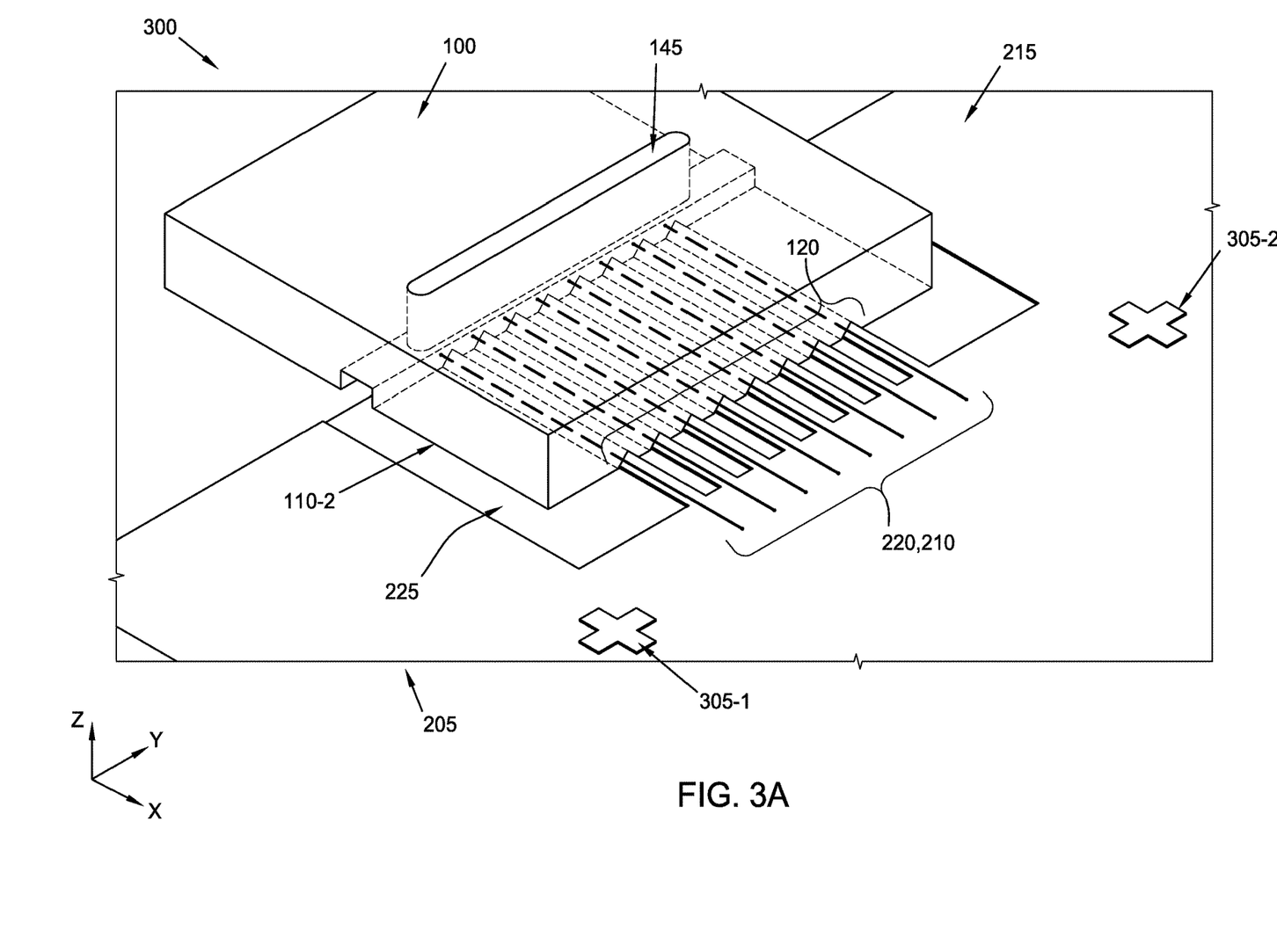
FIGS. 3A-3C illustrate views of an exemplary apparatus in which grooves of the lid member are engaged with ribs of the substrate, according to one embodiment.
Figure 3B:
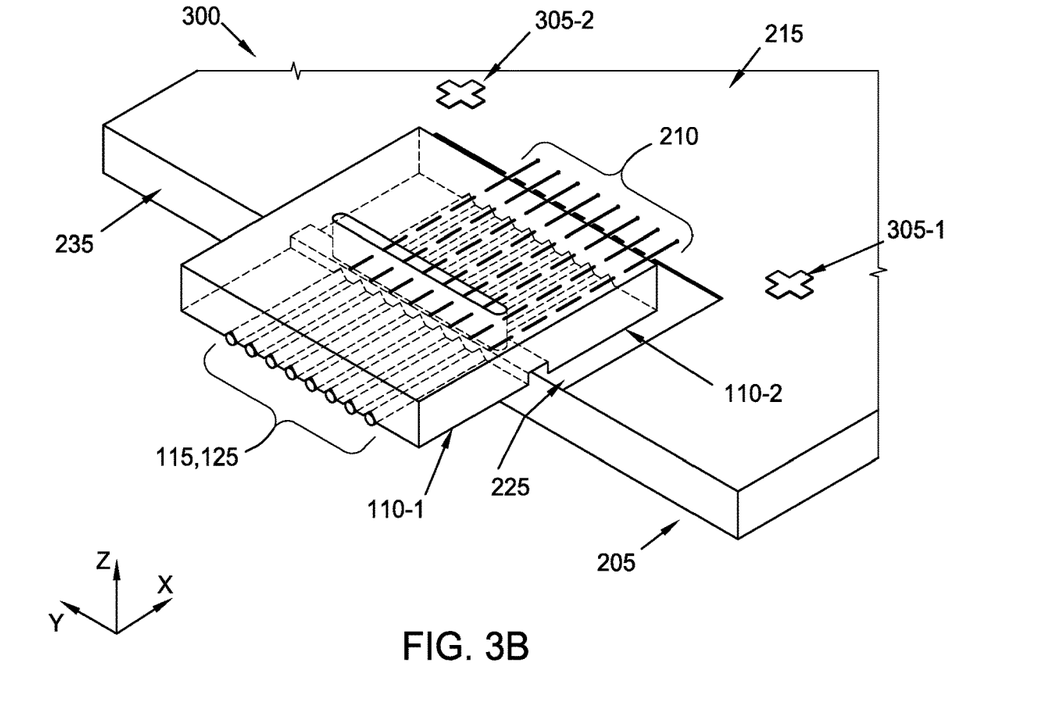
Figure 3C:
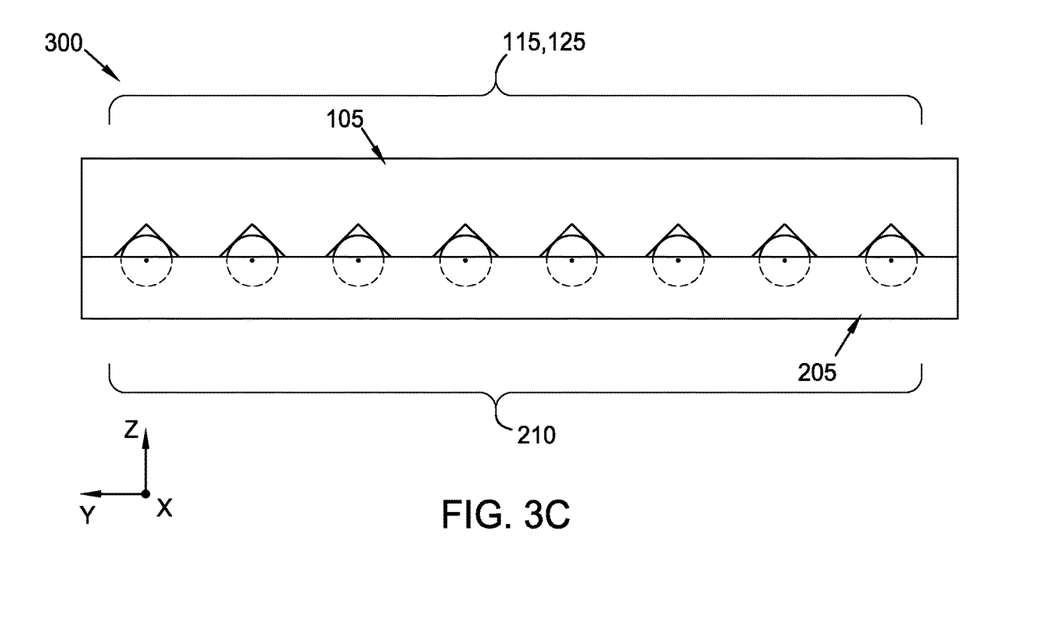

FIGS. 3A-3C illustrate views of an exemplary apparatus 300 in which grooves of the lid member are engaged with ribs of the substrate, according to one embodiment. More specifically, the apparatus 300 illustrates the connection of the assembly 100 of FIG. 1 with the substrate 205 of FIG. 2.

As shown, the second plurality of grooves 120 are engaged with the plurality of ribs 220, which provides an optical alignment of the plurality of optical fibers 125 with the plurality of waveguides 210. The relative motion of the assembly 100 and the substrate 205 may be controlled using any suitable alignment tools. In some embodiments, the top surface 215 of the substrate 205 comprises one or more alignment features 305-1, 305-2 for performing a visually-assisted alignment of the assembly 100 with the substrate 205.

In some embodiments, a suitable passive alignment of the plurality of optical fibers 125 with the plurality of waveguides 210 is achieved by engaging the second plurality of grooves 120 with the plurality of ribs 220. The engagement of the second plurality of grooves 120 with the plurality of ribs 220 may control the arrangement of the plurality of optical fibers 125 in the Y-direction and/or the Z-direction. In some embodiments, the bottom surface 110-2 of the lid member may be slidingly engaged with (or otherwise contacting) the recessed surface 225 when the second plurality of grooves 120 are engaged with the plurality of ribs 220. As discussed above, an epoxy or other adhesive may be applied through the opening 145 when the second plurality of grooves 120 are engaged with the plurality of ribs 220. In some cases, the epoxy or other adhesive may be UV-cured to rigidly adhere the assembly 100 with the substrate 205. Other curing techniques are also contemplated, such as curing at an ambient temperature, the application of heat, and the application of chemical(s).

The dimensions of the first plurality of grooves 115 and the second plurality of grooves 120 may be determined using trigonometric calculations. For example, given process constraints such as an etching angle or a saw blade angle, and the radius of the optical fiber 125, the groove width for the first plurality of grooves 115 may be calculated according to:

$$C=(R/\cos \theta)-(A \times \tan \theta),$$

where C represents a center height (as shown, in the Z-direction) of the optical fiber 125 relative to the bottom surface 110-1 or the bottom surface 110-2, R represents a radius of the optical fiber 125, θ represents the angle of the groove from the bottom surface 110-1 or the bottom surface 110-2, and A represents half of the groove width (2A) (as shown, in the Y-direction).

In cases where the first plurality of grooves 115 and the second plurality of grooves 120 have similar dimensioning, and each rib of the plurality of ribs 220 has a substantially rectangular cross section in the Y-Z plane, the rib width for the plurality of ribs 220 may be calculated according to:

$$W=2A-(2 \times H/\tan \theta),$$

where W represents the rib width (as shown, in the Y-direction), and H represents the rib height (as shown, in the Z-direction). Using these calculations, the groove angle and rib geometries can be optimized to provide alignment of the grooves and ribs with very tight tolerances. It should be noted that groove angles of 45, 60, and 54.74 degrees can be achieved with glass sawing processes, but other suitable angles are also contemplated.

Assume, in one example, that C=7 microns (μm), R=62.5 μm, and θ=45°. The groove width for the first plurality of grooves 115 may be calculated as approximately 162.8 μm. Assume further that the first plurality of grooves 115 and the second plurality of grooves 120 have similar dimensioning, such that the groove width for the second plurality of grooves 120 is also approximately 162.8 μm. Assume further that the rib height (in the Z-direction) for the plurality of ribs 220 is 20 μm. The rib width for the plurality of ribs 220 may be calculated as approximately 122.8 μm.

Other suitable values for the variables discussed above are also possible. For example, in the case where potassium hydroxide (KOH) is used to etch the first plurality of grooves 115, the angle θ=54.74°. The rib dimensions (e.g., height, width, and depth) may be controlled based on the corresponding geometry of the substrate 205 and/or the corresponding fibers 125. In some embodiments, values of the rib width and/or rib depth are between about 10 μm and about 500 μm. In some embodiments, the rib height (or alternately, the height between the top surface 215 and the recessed surface 225 is between about 5 μm and about 200 μm, such as between about 5 μm and about 25 μm. In some embodiments, the rib width is between about 100 μm and about 200 μm.

Figure 4A:
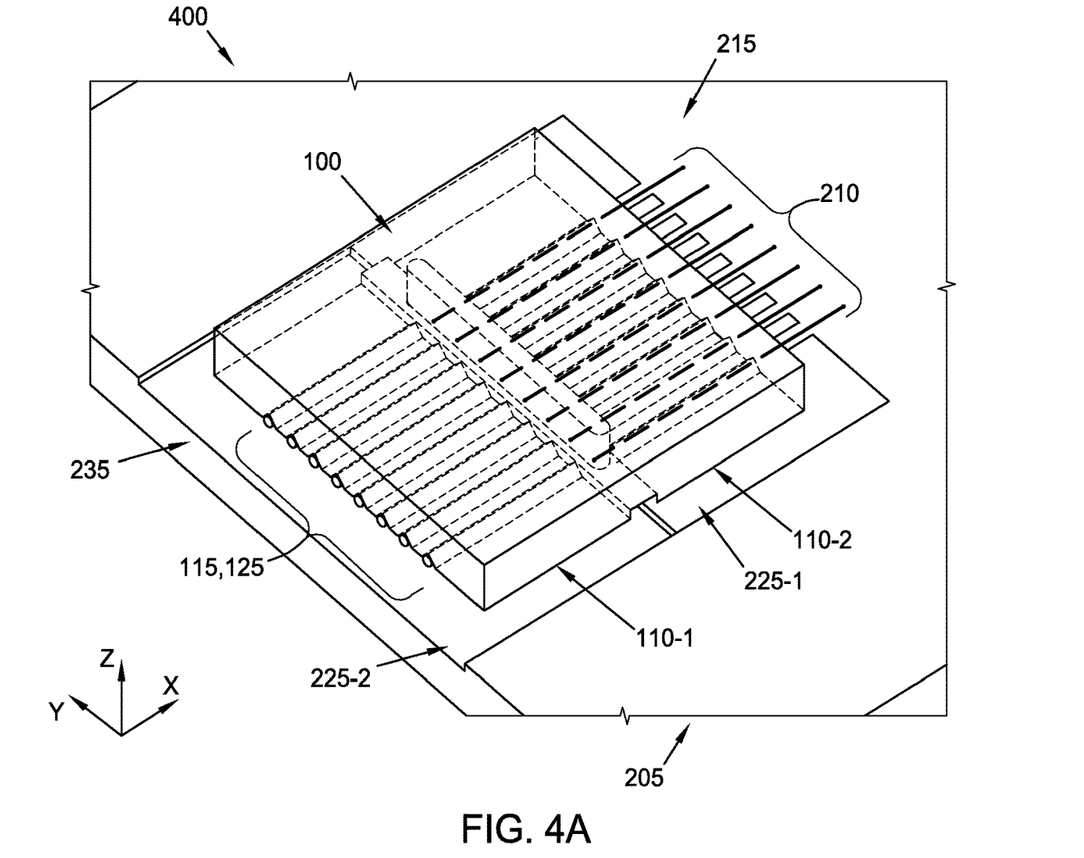
FIGS. 4A and 4B illustrate an alternate implementation of an exemplary apparatus, according to one embodiment.
Figure 4B:
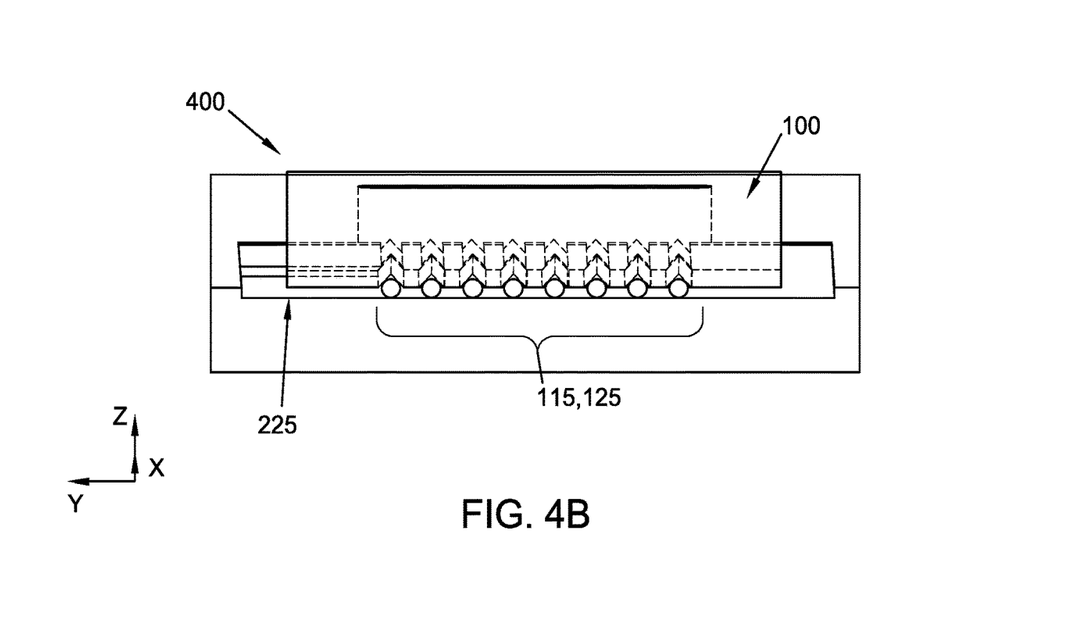

As shown in the apparatus 300, when the second plurality of grooves 120 are engaged with the plurality of ribs 220, the first plurality of grooves 115 and the plurality of optical fibers 125 do not overlap with the substrate 205 in the X-Y plane. However, FIGS. 4A and 4B illustrate an alternate implementation of an exemplary apparatus 400, in which the first plurality of grooves 115 and the plurality of optical fibers 125 may partly or fully overlap with the substrate 205. In some embodiments, the recessed surface 225 is dimensioned to accommodate the overlap of plurality of optical fibers 125 with the substrate 205. For example, the recessed surface 225 may comprise a "ledge" that is formed using DRIE or shallow dicing techniques.

In some embodiments, the substrate 205 comprises a first recessed surface 225-1 and a second recessed surface 225-2, and the plurality of ribs 220 extend from the first recessed surface 225-1 to the top surface 215. The first recessed surface 225-1 and the second recessed surface 225-2 may each be planar surfaces, although other profiles are possible. The height of the first recessed surface 225-1 and the second recessed surface 225-2 (in the Z-dimension) and/or the dimensions of the first plurality of grooves 115 and the second plurality of grooves 120 may be controlled such that, when the second plurality of grooves 120 are engaged with the plurality of ribs 220, the bottom surface 110-2 of the lid member 105 contacts the first recessed surface 225-1, and the plurality of optical fibers 125 contacts the second recessed surface 225-2.

Figure 5:
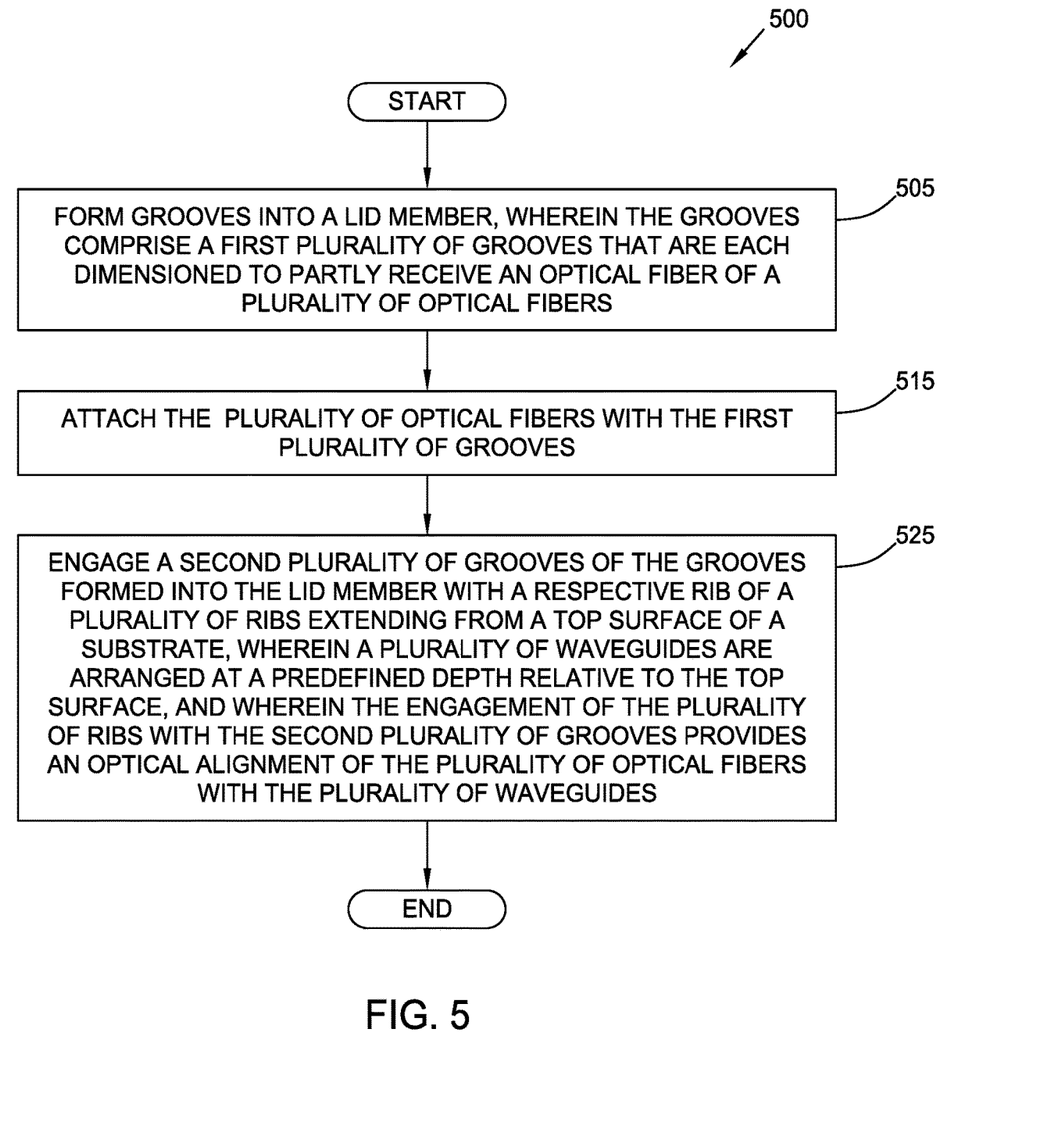
FIG. 5 illustrates an exemplary method of optically aligning a plurality of optical fibers with a plurality of waveguides of a substrate, according to one embodiment.

FIG. 5 illustrates an exemplary method 500 of optically aligning a plurality of optical fibers with a plurality of waveguides of a substrate, according to one embodiment. The method 500 may be performed in conjunction with embodiments discussed herein, such as the assembly 100 of FIG. 1 and/or the substrate 205 of FIG. 2.

Method 500 begins at block 505, where grooves are formed into a lid member. The grooves comprise a first plurality of grooves that are each dimensioned to partly receive an optical fiber of a plurality of optical fibers. At block 515, the plurality of optical fibers are attached with the first plurality of grooves. At block 525, a second plurality of grooves (of the grooves formed into the lid member) are engaged with a respective rib of a plurality of ribs extending from a top surface of a substrate. A plurality of waveguides are arranged at a predefined depth relative to the top surface. The engagement of the plurality of ribs with the second plurality of grooves provides an optical alignment of the plurality of optical fibers with the plurality of waveguides. Method 500 ends following completion of block 525.

Figure 6:
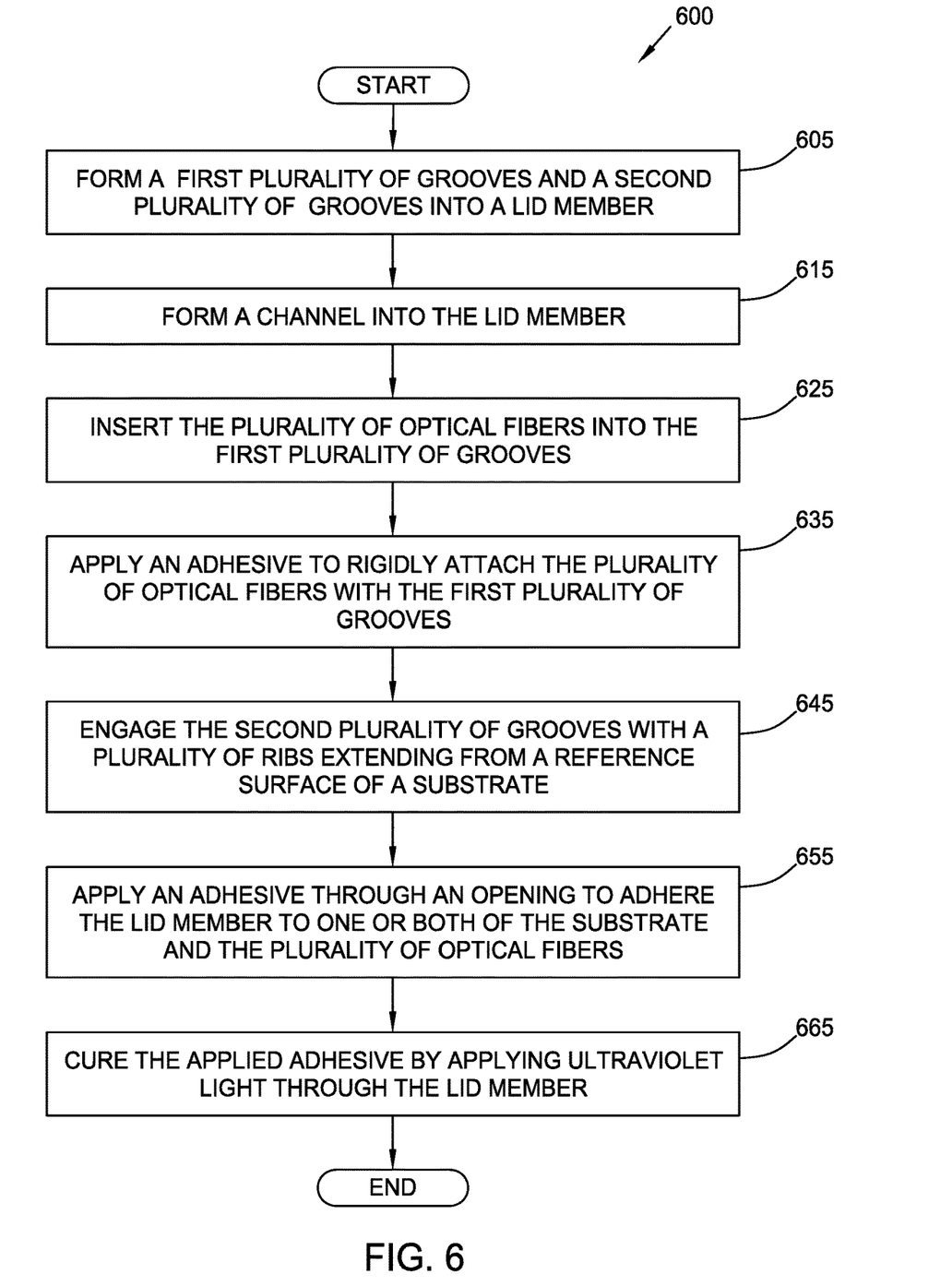
FIG. 6 illustrates an exemplary method 600 of optically aligning a plurality of optical fibers with a plurality of waveguides of a substrate, according to one embodiment.

FIG. 6 illustrates an exemplary method 600 of optically aligning a plurality of optical fibers with a plurality of waveguides of a substrate, according to one embodiment. The method 600 may be performed in conjunction with various embodiments discussed herein, such as the assembly 100 of FIG. 1 and/or the substrate 205 of FIG. 2.

Method 600 begins at block 605, where a first plurality of grooves and a second plurality of grooves are formed into a lid member. At optional block 615, a channel is formed into the lid member. At block 625, the plurality of optical fibers is inserted into the first plurality of grooves. At optional block 635, an adhesive is applied to rigidly attach the plurality of optical fibers with the first plurality of grooves. At block 645, the second plurality of grooves is engaged with a plurality of ribs extending from a reference surface of a substrate. At block 655, an adhesive is applied through an opening to adhere the lid member to one or both of the substrate and the plurality of optical fibers. At optional block 665, the applied adhesive is cured by applying ultraviolet light through the lid member. The method 600 ends following completion of block 665.

Figure 7:
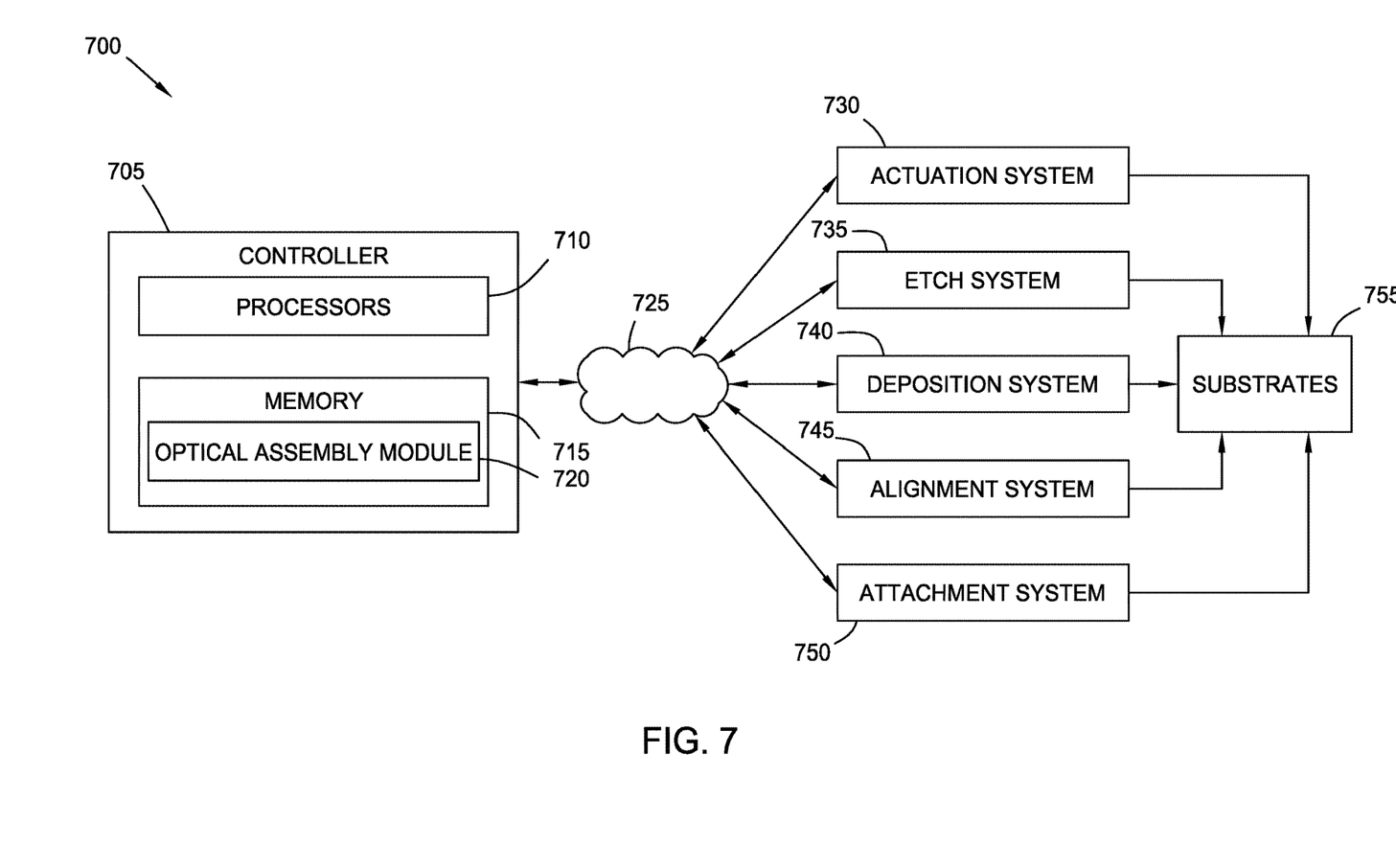
FIG. 7 is a block diagram of an exemplary system 700 for constructing an optical apparatus, according to one or more embodiments.

FIG. 7 is a block diagram of an exemplary system 700 for constructing an optical apparatus, according to one or more embodiments. Features of the system 700 may be used in conjunction with other embodiments, such as the apparatus 300 of FIG. 3 or the apparatus 400 of FIG. 4, which are discussed above.

The system 700 comprises a controller 705 comprising one or more computer processors 710 and a memory 715. The one or more computer processors 710 represent any number of processing elements that each can include any number of processing cores. Some non-limiting examples of the one or more computer processors 710 include a microprocessor, a digital signal processor (DSP), an application-specific integrated chip (ASIC), and a field programmable gate array (FPGA), or combinations thereof. The memory 715 may comprise volatile memory elements (such as random access memory), non-volatile memory elements (such as solid-state, magnetic, optical, or Flash-based storage), and combinations thereof. Moreover, the memory 715 may be distributed across different mediums (e.g., network storage or external hard drives).

The memory 715 may comprise a plurality of "modules" for performing various functions described herein. In one embodiment, each module includes program code that is executable by one or more of the computer processors 710. However, other embodiments may include modules that are partially or fully implemented in hardware (i.e., circuitry) or firmware of the controller 705. As shown, the memory 715 comprises an optical assembly module 720 configured to control various stages of manufacturing (or assembling) an optical apparatus. The optical assembly module 720 is configured to communicate control signals to one or more systems via a network 725. The network 725 may include one or more networks of various types, including a personal area network (PAN), a local area or local access network (LAN), a general wide area network (WAN), and/or a public network (e.g., the Internet).

As shown, the system 700 comprises an actuation system 730, an etch system 735, a deposition system 740, an alignment system 745, and an attachment system 750, each of which is communicatively coupled with the controller 705 via the network 725. Based on control signals received from the controller 705, one or more of these systems may be configured to manipulate one or more substrates 755, such as semiconductor substrates and/or glass substrates when constructing the optical apparatus.

In some embodiments, the actuation system 730 is configured to alter an orientation of the substrates 755 (e.g., translation and/or rotation) between different stages of processing, maintain an orientation of the substrates 755 during the processing, and so forth. For example, the actuation system 730 may comprise one or more robotic arms and/or gripping systems.

In some embodiments, the etch system 735 is configured to etch the substrates 755 to form features therein, according to any suitable etching technique(s). For example, the etch system 735 may be configured to form openings through the substrates 755 for forming vias, form grooves from a surface of the substrates 755, form a recess from the surface, and so forth. In one embodiment, the etch system 735 uses an anisotropic etch process such as deep reactive-ion etching (DRIE). In an alternate embodiment, one or more functions of the etch system 735 may be performed using other techniques, such as laser drilling, sawing, or machining.

In some embodiment, the deposition system 740 is configured to deposit conductive material onto the substrates 755. For example, the deposition system 740 may form vias in the openings etched or otherwise formed in the substrates 755, may form conductive traces at one or more surfaces of the substrates 755, and so forth. In some embodiments, vias extend through the substrates 755 from conductive traces on a first side of the substrates 755 to conductive traces on a second side of the substrates 755.

As part of constructing the optical apparatus, a semiconductor laser, a plurality of optical fibers, and/or other optical and/or electronic components may be placed on the substrates 755. In some embodiments, the alignment system 745 is configured to perform an optical alignment of the semiconductor laser and/or the plurality of optical fibers. For example, the alignment system 745 may comprise an active alignment system configured to provide optical signals to the optical fibers and/or apply an electrical signal to the semiconductor laser to generate an optical signal.

In some embodiments, the alignment system 745 is used to optically align the semiconductor laser and the plurality of optical fibers after attachment to the substrates 755. For example, the alignment system 745 may manipulate the substrates 755 to align the semiconductor laser and the plurality of optical fibers with respective waveguides formed in a semiconductor substrate. In other embodiments, the alignment system 745 may operate in conjunction with the actuation system 730 to manipulate the substrates 755 and/or the semiconductor substrate.

In some embodiments, the attachment system 750 is configured to attach the substrates 755 with one or more of: other substrates 755, the semiconductor substrate, the plurality of optical fibers, the semiconductor laser, and other optical and/or electronic components according to any suitable techniques. In some embodiments, the attachment system 750 may be used in multiple attachment stages. For example, the attachment system 750 may be configured to apply an epoxy between the optical fibers and a first one of the substrates 755, to apply an epoxy between the first one and a second one of the substrates 755, to apply an epoxy between the first one of the substrates 755 and a semiconductor substrate, and so forth. The attachment system 750 may further be configured to cure the epoxy, e.g., by applying an ultraviolet (UV) light.

In some embodiments, the attachment system 750 may further be configured to apply conductive material to couple the semiconductor laser and/or other electronic components with conductive traces on the substrates 755. For example, the attachment system 750 may apply a conductive layer to bond conductive contacts of the semiconductor laser with conductive traces on the substrates 755. The attachment system 750 may further be configured to couple the conductive traces on the substrates 755 with conductive portions of the semiconductor substrate. For example, the attachment system 750 may wire bond or apply solder/conductive epoxy to connect the conductive traces on the substrates 755 with corresponding conductive traces on the semiconductor substrate.

The controller 705 may be implemented in any suitable form. In some embodiments, the controller 705 comprises a singular computing device providing centralized control of the construction process. In other embodiments, the controller 705 represents multiple, communicatively coupled computing devices, which may or may not have centralized control. For example, some or all of the actuation system 730, the etch system 735, the deposition system 740, the alignment system 745, and the attachment system 750 may comprise local controllers that are in communication with the controller 705 via the network 725. In an alternate embodiment, the operation of the actuation system 730, the etch system 735, the deposition system 740, the alignment system 745, and the attachment system 750 may be achieved independently of centralized control.

Further, while the system 700 is described primarily in terms of manipulating the substrates 755, the various systems described herein may interact with other components as part of constructing the optical apparatus. For example, the actuation system 730 may be configured to manipulate the plurality of optical fibers, the semiconductor laser, and other electrical and/or optical components.

Generally, passive alignment techniques may require tighter tolerances and greater accuracy, which tends to increase manufacturing costs of piece parts. In various embodiments discussed herein, a lower cost piece part (e.g., the lid member 105 of FIG. 1) is described that is able to achieve the tight tolerances necessary for passive alignment and/or for vision-assisted active alignment. By sawing v-grooves into a piece of glass, tolerances within +/−0.5 microns can be achieved. Further, the cost of the sawing v-grooves into glass is very small (e.g., on the order of tens of cents per part).

Further, efficiently coupling light to single-mode optical fibers may require tight control of the optical fiber placement. In various embodiments discussed herein, the optical waveguides may include spot converters that provide a mode size similar to that of single-mode optical fibers, and an index-matching epoxy may be applied in the optical path. As a result, alignment tolerances in the X, Y, and Z dimensions may be relaxed from sub-micron to +/− several microns. For example, the alignment tolerances in the Y and Z dimensions can be relaxed to +/−2 microns and the alignment tolerance in the X dimension can be relaxed to +/−10 or more microns.

To further improve optical coupling, vision-assisted alignment or active alignment may be performed in a limited number of axes. Since interlocking the grooves of the lid member 105 with the ribs or other features of the substrate is effective to provide at least a coarse alignment of the optical fibers with the waveguides of the substrate, the vision-assisted alignment or the active alignment may be used to provide a finer alignment while adding minimal process time. Use of these simple and inexpensive mechanical features to "pre-align" the optical fibers to the photonic chip can reduce or eliminate the cost of automation (e.g., precision placement and peak searching algorithms), ultimately reducing the overall cost of alignment.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:
   a plurality of optical fibers;
   a lid member having a bottom surface defining a first plurality of grooves and a second plurality of grooves that is separated from the first plurality of grooves by a channel, wherein the first plurality of grooves are each dimensioned to partly receive an optical fiber of the plurality of optical fibers; and
   a substrate comprising:
      a plurality of waveguides arranged at a predefined depth relative to a reference surface of the substrate; and
      a plurality of ribs extending from the reference surface, wherein each rib of the plurality of ribs is dimensioned to engage with a respective groove of a second plurality of grooves of the lid member,
   wherein engaging the plurality of ribs of the substrate with the second plurality of grooves of the lid member provides an optical alignment of the plurality of optical fibers with the plurality of waveguides.

2. The apparatus of claim 1, wherein the substrate defines a top surface, wherein the reference surface comprises a recessed surface that is recessed from the top surface, and wherein the plurality of ribs extend from the recessed surface to the top surface.

3. The apparatus of claim 1, wherein the lid member comprises one or more of a glass material, a silicon material, and a moldable material.

4. The apparatus of claim 3, wherein the first plurality of grooves and the second plurality of grooves are formed into the bottom surface of the lid member via one or more of a sawing operation, a molding operation, an etching operation, and a laser patterning operation.

5. The apparatus of claim 1, wherein, when the plurality of ribs are engaged with the second plurality of grooves, the plurality of optical fibers do not overlap with the substrate.

6. The apparatus of claim 1, wherein, when the plurality of ribs are engaged with the second plurality of grooves, the plurality of optical fibers are at least partly overlapping with the substrate.

7. The apparatus of claim 6, wherein the substrate defines a top surface, a first recessed surface, and a second recessed surface, wherein the plurality of ribs extend from the first recessed surface to the top surface, and wherein, when the plurality of ribs are engaged with the second plurality of grooves, the bottom surface of the lid member contacts the first recessed surface, and the plurality of optical fibers contacts the second recessed surface.

8. The apparatus of claim 1, wherein an opening extends between a top surface of the lid member and the channel, and wherein, when the plurality of ribs are engaged with the second plurality of grooves, an adhesive is applied through the opening to adhere the lid member to one or both of the substrate and the plurality of optical fibers.

9. The apparatus of claim 8, wherein the lid member comprises a material that is transmissive of ultraviolet light, and wherein the applied adhesive is partly or completely cured by applying ultraviolet light through the lid member.

10. The apparatus of claim 1, wherein the channel extends substantially perpendicular to longitudinal axes of one or both of the first plurality of grooves and the second plurality of grooves.

11. A method comprising:
    forming a first plurality of grooves, a second plurality of grooves, and a channel separating the first plurality of grooves from the second plurality of grooves into a lid member, wherein each of the first plurality of grooves is dimensioned to partly receive an optical fiber of a plurality of optical fibers;
    inserting the plurality of optical fibers into the first plurality of grooves; and
    engaging the second plurality of grooves with a plurality of ribs extending from a reference surface of a substrate,
    wherein a plurality of waveguides is arranged at a predefined depth relative to the reference surface, and
    wherein engaging the plurality of ribs of the substrate with the second plurality of grooves of the lid member provides an optical alignment of the plurality of optical fibers with the plurality of waveguides.

12. The method of claim 11, further comprising:
    applying, prior to engaging the second plurality of grooves with the plurality of ribs, an adhesive to rigidly attach the plurality of optical fibers with the first plurality of grooves.

13. The method of claim 11, wherein the lid member comprises a glass material, and wherein forming the first plurality of grooves and the second plurality of grooves is performed via one of a sawing operation, a molding operation, and a laser patterning operation.

14. The method of claim 13,
    wherein forming the first plurality of grooves and the second plurality of grooves is performed via a first sawing operation on a bottom surface of the lid member, and
    wherein forming the channel is performed via a second sawing operation on the bottom surface.

15. The method of claim 14, wherein an opening extends between a top surface of the lid member and the channel, the method further comprising:
    applying, when the plurality of ribs are engaged with the second plurality of grooves, an adhesive through the opening to adhere the lid member to one or both of the substrate and the plurality of optical fibers.

16. The method of claim 15, wherein the lid member comprises a material that is transmissive of ultraviolet light, the method further comprising:
    partly or completely curing the applied adhesive by applying ultraviolet light through the lid member.

17. The method of claim 14,
    wherein the first sawing operation forms a plurality of continuous grooves into the bottom surface of the lid member, and
    wherein the second sawing operation separates the plurality of continuous grooves into the first plurality of grooves and the second plurality of grooves.

18. The method of claim 11, wherein, when the plurality of ribs are engaged with the second plurality of grooves, the plurality of optical fibers do not overlap with the substrate.

19. The method of claim 11, wherein engaging the plurality of ribs with the second plurality of grooves causes the plurality of optical fibers to be at least partly overlapping with the substrate.

20. The method of claim 19, wherein the substrate defines a top surface, a first recessed surface, and a second recessed surface, wherein the plurality of ribs extend from the first recessed surface to the top surface, and wherein engaging the plurality of ribs with the second plurality of grooves causes a bottom surface of the lid member to contact the first recessed surface, and the plurality of optical fibers to contact the second recessed surface.

\* \* \* \* \*